April 29, 1952    J. E. TOM    2,595,023
TRACTOR ATTACHMENT

Filed April 19, 1947    2 SHEETS—SHEET 1

INVENTOR
JOHN E. TOM

Bates, Teare, & McBean
ATTORNEYS

April 29, 1952 J. E. TOM 2,595,023
TRACTOR ATTACHMENT
Filed April 19, 1947 2 SHEETS—SHEET 2

INVENTOR
JOHN E. TOM
Bates, Pearl & McBean
ATTORNEYS

Patented Apr. 29, 1952

2,595,023

UNITED STATES PATENT OFFICE 2,595,023

TRACTOR ATTACHMENT

John E. Tom, East Cleveland, Ohio, assignor to Earl Realty Company, Cleveland, Ohio, a corporation of Ohio Application April 19, 1947, Serial No. 742,611

11 Claims. (Cl. 56—26)

This invention relates to garden implements and particularly to a lawn mower attachment for a two-wheeled power driven tractor.

Lawn mowers have heretofore been attached to two-wheeled power actuated tractors, but in most instances they are mounted at the rear of the tractor and are pulled thereby. An objection to such arrangement, however, is that wheels of the tractor press the grass down immediately in advance of the cutters. Moreover, the rear mounting prevents the mower from being moved up close to walls, trees, shrubbery or the like.

An object of the present invention is to mount a lawn mower in front of a tractor and yet to so arrange the mounting that the mower will turn and track with the wheels of the tractor. In this way the operator not only has a better observation of the surface being cut, but also can manipulate the mower to cut closely against immovable objects.

Figure 1:
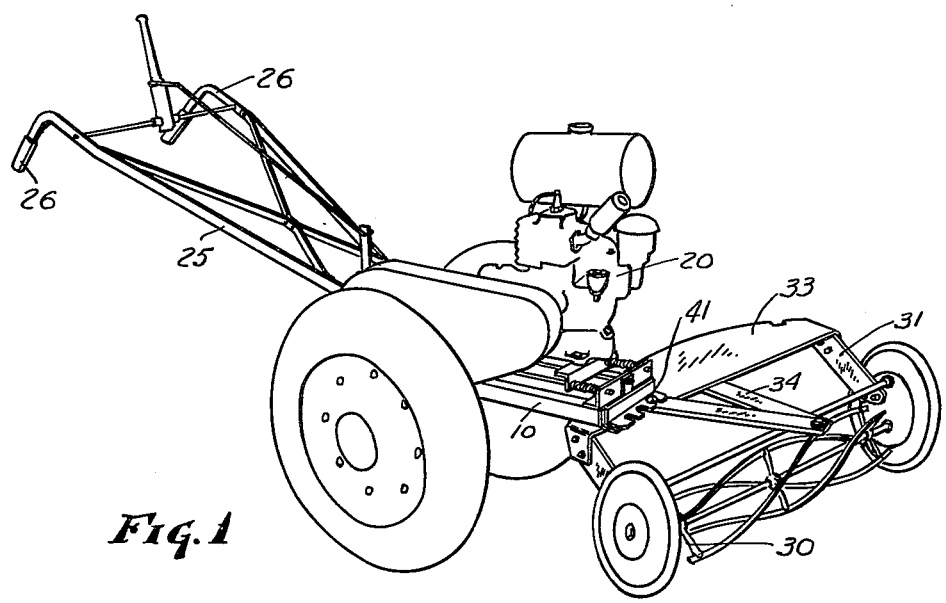
Figure 2:
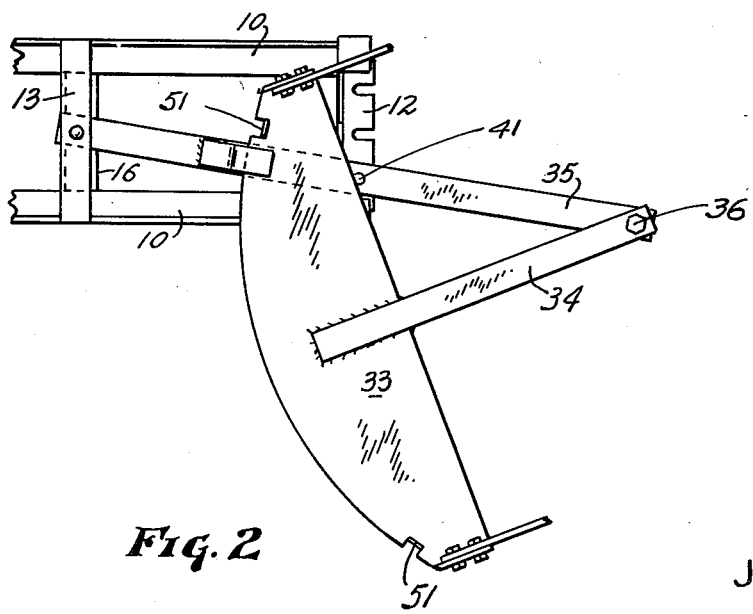
Figure 3:
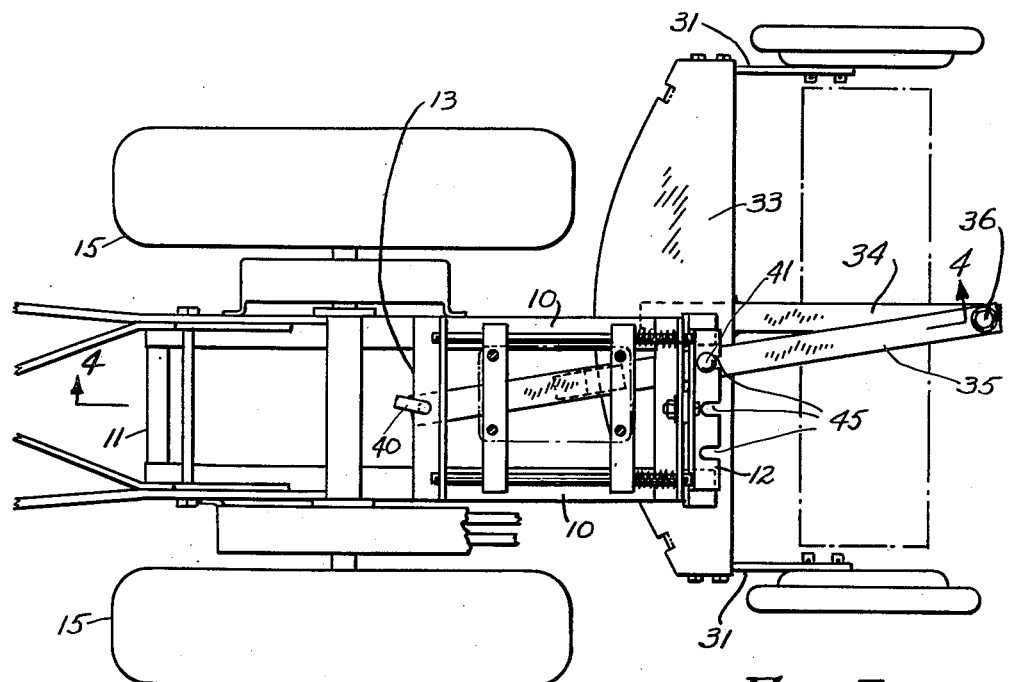
Figure 4:
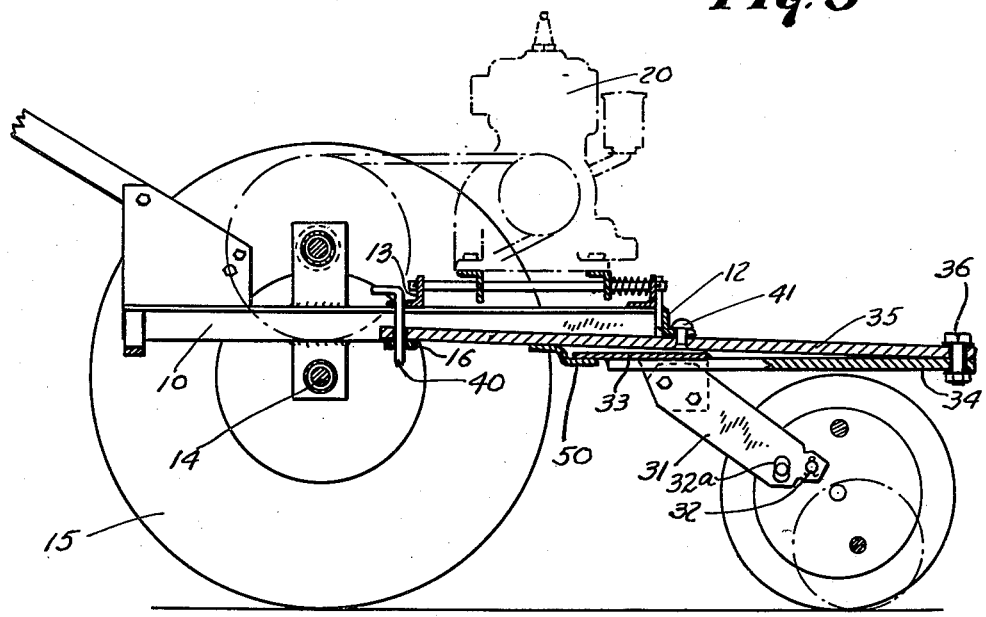

Referring now to the drawings, Fig. 1 is a perspective view of a power tractor embodying the present invention; Fig. 2 is a bottom plan view of a portion of the mechanism used for connecting the lawn mower to the tractor; Fig. 3 is a top plan view of the invention with the power unit removed from the tractor, and Fig. 4 is a section taken on a plane indicated by the line 4—4 in Fig. 3.

The tractor with which the invention is illustrated has a frame that includes longitudinally extending bars 10, end bars 11 and 12 and a cross bar 13. An axle 14 is journalled on the frame and supports ground-engaging wheels 15, while a motor indicated in general at 20 is suitably connected to the axle for supplying power to the wheels 15. An extension 25 of the frame terminates in handles 26 by means of which the tractor is guided during use.

The lawn mower with which the present invention is used is indicated in general at 30 as having arms 31 pivotally connected at 32 and 32a thereto and extending upwardly and rearwardly therefrom. A plate 33 is attached to the upper ends of the arms and has a bar 34 rigidly attached, as by welding, thereto and projecting forwardly thereof. The mower, arms, and plate constitute a unitary construction with which the present invention is adapted to be used.

To connect the lawn mower to the frame I have shown a push bar 35, the forward end of which is pivotally connected at 36 to the bar 34, and the rearward end of which is detachably fastened to the tractor frame. In the preferred form, the detachable connection comprises a pin 40 which extends through registering openings in the cross bar 13 and the bar 35 and into a lower cross bar 16, together with a pin 41 which is permanently affixed to the bar 35 and is adapted to enter any one of a plurality of slots 45 in the end bar 12. In Fig. 3 the pin 41 is shown within the left hand slot 45 as viewed from the rear of the tractor in which position the left hand wheel of the mower is beyond the confines of the left hand wheel of the tractor. Such position is suitable for cutting around a lawn in a counterclockwise direction. If it is desired to work in a clockwise direction, then the pin 41 would be positioned in the right hand slot, as is shown in Fig. 2.

The present invention is advantageous in that the lawn mower is in effect pulled forwardly from the pivot 36 which is disposed forwardly of the cutting knives thereon, so that the mower tends to assume a position at right angles to the line of movement but readily adapts itself to resistances which may be encountered as the cutting proceeds, while due to the rigidity of the connection between the push bar 35 and the tractor frame, the mower responds readily to any turning movement imparted to the handles 26 by the operator. The plate 33 is guided in such movement by a tongue 50 which is rigidly fastened to the underside of the bar 35 and which acts as a shelf upon which the rearward end of the plate 33 rests. Suitable ears 51 struck downwardly from the plate are adapted to engage the sides of the tongue and to act as a stop for limiting the degree of turning movement of the mower. A further advantage of the invention is that the lawn mower is positioned sufficiently far in front of the tractor that the operator can observe the position of the surface being cut, and can manipulate the tractor adequately to vary the position of the mower in accordance with requirements of operating conditions.

I claim:

1. In combination, a two-wheeled frame, a lawn mower having arms pivotally attached thereto and extending upwardly and rearwardly therefrom, a plate connecting said arms, a bar attached to the plate and extending forwardly thereof, a second bar carried by the frame and pivotally connected to the first-named bar, the second bar having a tongue cooperating therewith to guide the plate in its angular movement with relation to the frame.

2. The combination of a wheeled frame, a lawnmower, a substantially horizontal plate carried by the lawnmower at the rear thereof, a bar attached to said plate and extending forwardly thereof, a second bar pivotally connected to the wheeled frame and pivotally connected to the forward end of the first named bar, said plate having a rear edge concentric of the pivotal connection between the bars, and means on the bar which is pivotally connected to the frame underhanging said rear edge of the plate to support the plate as it swings.

3. The combination of a main frame having longitudinal bars and cross bars, an arm pivoted at its rear end to one of the cross bars and extending across another cross bar, means for locking the swinging bar in various positions at the latter cross bar, a mower having its own frame, and means extending forward from the mower frame and pivoted to the forward end of the swinging bar carried by the main frame.

4. The combination of a wheeled frame, a swingable bar pivoted at its rear end to the frame and extending forwardly of the frame, a notched bar carried by the frame extending across an intermediate portion of the swinging bar, means on the swinging bar for entering any of the notches to hold the swinging bar in various positions, and a lawnmower having means extending forwardly from its frame and pivoted to the forward end of the swinging bar.

5. The combination of a pair of supporting wheels, a main frame carried thereby having longitudinal bars and cross bars, a swinging bar pivoted to one of the cross bars, means for locking the swinging bar in various positions to another of the cross bars, a mower having a substantially horizontal plate carried by the mower frame above and at the rear of the mower, a bar extending forwardly from said plate and rigid therewith, a vertical pivotal connection between the forward ends of the said plate bar and the said swinging bar, a tongue on the swinging bar underhanging the rear edge of said plate and supporting the same while allowing the plate to swing in a substantially horizontal plane about said vertical pivot.

6. In combination, a two-wheeled frame, the frame having longitudinally extending bars, end bars, and a cross bar, a push bar having one end thereof pivotally attached to the cross bar and having an intermediate portion attachable in various positions to said end bar at the forward end of the frame, a two-wheeled lawn mower having a draw bar carried thereby and extending forwardly thereof from a point rearward of said mower, said forwardly extending end of the draw bar being pivotally connected to the forward end of said push bar.

7. In combination, a wheeled frame, a lawn mower disposed in front of the wheeled frame and having a cutting element and having a frame with a transverse portion at the rear of the element movably connected to the wheeled frame, and a bar connected to said wheeled frame and projecting forwardly across said portion, and a member extending forwardly from the lawn mower frame and pivotally connected at its forward end to the forward end of said bar.

8. The combination of a two-wheeled frame, a lawn mower disposed in front of the frame, a push bar extending forwardly from the frame and over the mower, the mower having a portion at the rear thereof movably held on the two-wheeled frame and a member extending forwardly from said portion and pivotally connected at its forward end to the forward end of said push bar.

9. In combination, a two-wheeled frame, a lawn mower disposed in front of said frame, a bar detachably connected at its rear end to the wheeled frame and extending forwardly therefrom over the mower, said mower having a transverse portion at its rear, a guiding connection between said portion and the wheeled frame enabling said portion to swing laterally with reference to the wheeled frame, and a member extending forwardly from said transverse portion and connected at its forward end to the forward end of said bar.

10. The combination of a wheeled frame, a lawn mower disposed in front of the frame, a push bar extending forwardly from the frame and over the mower, the mower having a portion at the rear thereof movably guided on the wheeled frame, a bar pivotally connected on a vertical axis to the wheeled frame and extending forwardly thereof, means for holding said bar in various longitudinal positions relative to the wheeled frame, and a member extending forwardly from said portion of the mower and pivotally connected at its forward end to the forward end of the bar projecting from the wheeled frame.

11. In combination, a wheeled frame, a lawn mower disposed in front of the wheeled frame and having a cutting element and having a frame with a transverse portion at the rear of the element, a bar connected to said wheeled frame and projecting forwardly, and means extending forward from the transverse portion of the lawn mower and pivotally connected at its forward end to the forward end of said bar, said transverse portion having a convex rear edge slidably guided by means on the bar.

JOHN E. TOM.

REFERENCES CITED

The following references are of record in the file of this patent:

UNITED STATES PATENTS

| Number | Name | Date |
|---|---|---|
| 1,279,060 | Wilder | Sept. 17, 1918 |
| 1,562,709 | McNutt | Nov. 24, 1925 |
| 1,904,376 | Kruckemeyer | Apr. 18, 1933 |
| 1,951,079 | Ronning | May 1, 1934 |
| 2,194,297 | Drumm | Mar. 19, 1940 |
| 2,195,306 | Henry et al. | Mar. 26, 1940 |
| 2,368,290 | Donald | Jan. 30, 1945 |